United States Patent [19]

Bauer et al.

[11] Patent Number: 5,780,076
[45] Date of Patent: Jul. 14, 1998

[54] COMPRESSION APPARATUS

[76] Inventors: Heinz Bauer, Rungestrasse 17, D-81475 München; Achim Roland Bernhardt, Birkenstrasse 21, D-63512 Hainburg, both of Germany

[21] Appl. No.: 655,164
[22] Filed: May 30, 1996

[30] Foreign Application Priority Data

May 31, 1995 [DE] Germany ............... 195 19 968.5

[51] Int. Cl.$^6$ .................................. B29C 45/17
[52] U.S. Cl. .............. 425/533; 264/37; 264/572; 425/130; 425/546
[58] Field of Search .............. 425/130, 533, 425/546, 355, 542; 264/572, 328.12, 328.13, 37

[56] References Cited

U.S. PATENT DOCUMENTS

| | | | |
|---|---|---|---|
| 5,066,214 | 11/1991 | Baxi et al. | 264/572 |
| 5,076,778 | 12/1991 | Strunk et al. | 264/572 |
| 5,112,563 | 5/1992 | Baxi | 264/572 |
| 5,169,648 | 12/1992 | Eckardt et al. | 264/572 |
| 5,580,586 | 12/1996 | Yokoyama | 425/355 |

*Primary Examiner*—Jay H. Woo
*Assistant Examiner*—Joseph Leyson
*Attorney, Agent, or Firm*—Sixbey, Friedman, Leedom & Ferguson; David S. Safran

[57] ABSTRACT

A compression apparatus which is operated in association with at least two mold parts which can move relative to one another. The compression apparatus is formed of at least one compression units having a working chamber and a working element which can move in it. A gaseous medium can be provided to the working chamber under any initial pressure. During the closing motion of the parts of the mold, the working element is moved in the working chamber, such that the volume in the working chamber is reduced, and in this way, in the course of the closing motion, the gaseous medium is compressed in the working chamber. The compressed gaseous medium can then be sent to a consumer with or without intermediate storage. A compression apparatus of this type is intended for an injection molding machine in which gas pressurization is to take place in a cavity. In one embodiment, the compression apparatus integrated into the mold or into one of two mold parts, or its platens, adapter plates or the like, and in another form, it is attached to one of the mold parts. Optionally, the compression apparatus can comprise several compression stages formed by a series connection of a plurality of individual working chambers, with or without cooling of the gaseous medium as it moves between the compression stages.

18 Claims, 7 Drawing Sheets

5,780,076

COMPRESSION APPARATUS

BACKGROUND OF THE INVENTION

1. Field of the Invention

The invention relates to a compression apparatus which can be operated in conjunction with at least two parts relatively movable parts of a mold.

2. Description of Related Art

There are different types of compression apparatus, of the aforementioned type. With regard to how they operate, these compressors are divided especially into motor driven or hydraulically/pneumatically driven compression apparatus. All of these devices are built as separate assemblies which can be used, for example, for pressurized gas supply. Therefore, with the use of these compression apparatus, additional construction and cost expenditures are necessary, resulting in increased operating costs as well.

In molds comprised of several parts which can move relative to one another, especially a forming mold such as an injection mold, for guidance and alternate-side alignment of the forming mold parts which can move relative to one another, for example, pins are provided which are accommodated by location holes in a respective other mold part and which can move therein. When the forming mold is closed, the pins move in the location holes as far as the vicinity of its base, and when the forming mold is opened, they move in the opposite direction.

Especially in forming molds for injection molding, a cavity formed by the mold parts is pressurized with gas to form the shaped part. To do this, for example, an injector or a nozzle can be provided which discharges into the cavity and which is connected to a pressure source. In this way, the cavity is pressurized with a gaseous medium which is at a predetermined pressure, in which the pressure can optionally be controlled. For pressurization, separate means are necessary which contribute not only to an increase of production costs, but also to an increase of operating costs.

SUMMARY OF THE INVENTION

Therefore, the primary object of the invention is to make provide a compression apparatus which allows production of a compressed, gaseous medium in a cost-favorable manner.

According to a preferred embodiment of the invention, a compression apparatus is provided which can be operated to produce relative movement between at least two mold parts, such as press platens, adapter plates, or the like, and at least one working element which can move in at least one working chamber, such as a mold cavity. The compression apparatus is constructed so that the relative movement of the mold parts, such as press platens, adapter plates, or the like, by means of the working element, compresses a gaseous medium in the working chamber which is sealed tight to the environment.

Accordingly, a compression apparatus is thus devised in which the relative movement of at least two mold parts, such as platens, adapter plates, or the like, is used to compress a gaseous medium in a working chamber. Thus, according to the invention, a compression apparatus is obtained which can be arranged and designed to save space and which does not require additional driving means. This results in a simplified structure for producing a compressed gaseous medium which can be operated in interaction with the relative movement of the mold parts, such as platens, adapter plates, or the like. As a result, both the system production costs and the system operating costs can be significantly reduced. The compression apparatus according to the invention, thus, allows cost-favorable pressure generation or pressure boosting without the need for separated additional pressure generation means.

Preferably, the gaseous medium is compressed in the working chamber of the compression apparatus during the mold closing process, and the gaseous medium compressed in this way can then be used for a consumer. To do this, an outlet channel is connected to the working chamber and it contains a one-way valve which prevents the compressed medium from flowing back. In this design of the compression apparatus, the movement of at least two mold parts, such as platens, adapter plates, or the like, relative to one another can be used in the mold closing process, and furthermore, the compressed gaseous medium produced in this way can be, subsequently, used directly to pressurize a cavity formed by the mold parts. The one-way valve which is provided in the outlet channel and which prevents the medium compressed in the working chamber from flowing back is designed to effectively preclude release of the already compressed medium when the working element moves in a direction enlarging the volume in the working chamber.

Preferably, the medium compressed in the working chamber can be supplied to a cavity of the mold for pressurization. In this way, a forming mold with a pressurized cavity can operate cost-favorably.

The compression apparatus according to the invention can, furthermore, be designed such that the medium compressed in the working chamber can be supplied to a storage device which can be selectively connected to the consumer. In this design, thus, the medium compressed in the working chamber is not sent immediately and directly to the consumer, but intermediate storage takes place in a storage device which can then be connected to the consumer depending on need.

According to one preferred embodiment of the invention, the compression apparatus comprises several working chambers which are connected via connecting channels to form a series connection. In this case, the compression apparatus comprises several compression stages having working chambers connected in series, so that the compression pressure can be increased from working chamber to working chamber in order to provide compressed medium with different compression pressures, or viewed overall, to be able to accomplish very high pressurization of the medium. In order to be able to choose the vary the corresponding pressurization in the working chambers of the different working stages, the working elements of the respective working chambers can have effective surfaces of different sizes.

Optionally, between the series connected working chambers, the compressed medium can undergo intermediate cooling, for example, intermediate cooling by means of water.

Preferably, the compression apparatus according to the invention is designed such that, before the start of the closing process, a predetermined pressure of gaseous medium is provided in the working chamber via a feed line. There can be a control valve in the feed line. In this way, before the actual compression process, when the forming mold is closed a predetermined, selectable initial pressure of the gaseous medium which can be controlled preferably by a control valve can be set in the working chamber or chambers in order to be able to undertake universal matching of the compression apparatus to the particular circumstances of a specific application. Thus, optionally, different final compression pressures can be achieved in the gaseous medium.

It is also preferable if the compression apparatus according to the invention operates such that, when the mold is closed, the pressure remains constant, and optionally, time-dependent pressurization is undertaken, and that, when the mold is being opened, a slow pressure drop takes place in the working chamber, preferably, an auxiliary valve being used to drop the pressure to ambient pressure conditions shortly before the mold is completely opened. In this way, the necessary pressure conditions when the mold is opened and the safety aspects in the operation of an associated injection molding machine can be taken into account.

With regard to the arrangement and design of the compression apparatus according to the invention there are several possibilities. For example, the working chamber and the working element can be integrated into the associated relatively movable mold parts, such as platens, adapter plates or the like, such that a compact design can be achieved. On the other hand, the working chamber and the working element can be attached separately to the relatively moving mold parts, and can interact when the mold parts move. In this case, the compression apparatus is located on the relatively moving mold part, but it can also be produced separately therefrom and it is installed later. In this way, the number of compression apparatus and the size thereof can be adapted to the prerequisites at the time.

There are also several possibilities with respect to the arrangement of the working chamber and working element. According to one preferred embodiment, the working chamber and the working element are assigned to the movable mold part. Alternatively, the working chamber can be provided on a moving mold part and the working element on a stationary mold part so that the working chamber and the movable working element are assigned to different mold parts, such as platens, adapter plates or the like. Of course the design can also be optionally selected to be the opposite.

In one preferred embodiment, the working element can be formed by a pin on one of the mold parts which is accommodated in an assigned location hole on the other mold part to act as a piston. The pin and the location hole can be used at the same time to guide the mold parts in their relative motion during the opening and closing process of the mold. In this embodiment, the compression apparatus is formed by those parts which, in the past, inherently had only a guide function in a mold of this type so that the additional construction measures necessary to implement the compression apparatus according to the invention, according to this preferred embodiment, can be implemented with only slight increase in cost.

Preferably, the compression apparatus according to the invention is used in a mold in the form of an injection mold of an injection molding machine. Here, the consumer can be comprised of an injector or a nozzle which discharges into the cavity formed by the forming mold in the closed position. In these embodiments, the compression apparatus is, thus, assigned to the actual forming mold, such as the injection mold, so that pressurization of the cavity can be obtained, optionally, directly or indirectly without separate compressor systems, in which, especially, also fault-susceptible lines and connecting lines which entail pressure losses can be avoided, since compression takes place in the immediate vicinity of the cavity, and therefore, can be used as much as possible without pressure loss for cavity pressurization.

In the compression apparatus according to the invention, it is important that, on the one hand, the relative movement of the parts, such as platens, adapter plates or the like, of a mold, such as a forming mold, is used for the compression process, and that, on the other hand, there is an efficiently operating compression apparatus which occupies as little space as possible, which can be versatilely adapted to the space conditions in the forming molds and can be operated such that the consumer located in the immediate vicinity can be supplied in the desired manner.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 5 is a schematic view of the injection molding machine of FIG. 3, the compression apparatus being illustrated in the closed position of the forming mold and with the compression process completed in;

DETAILED DESCRIPTION OF THE PREFERRED EMBODIMENTS

Figure 1:
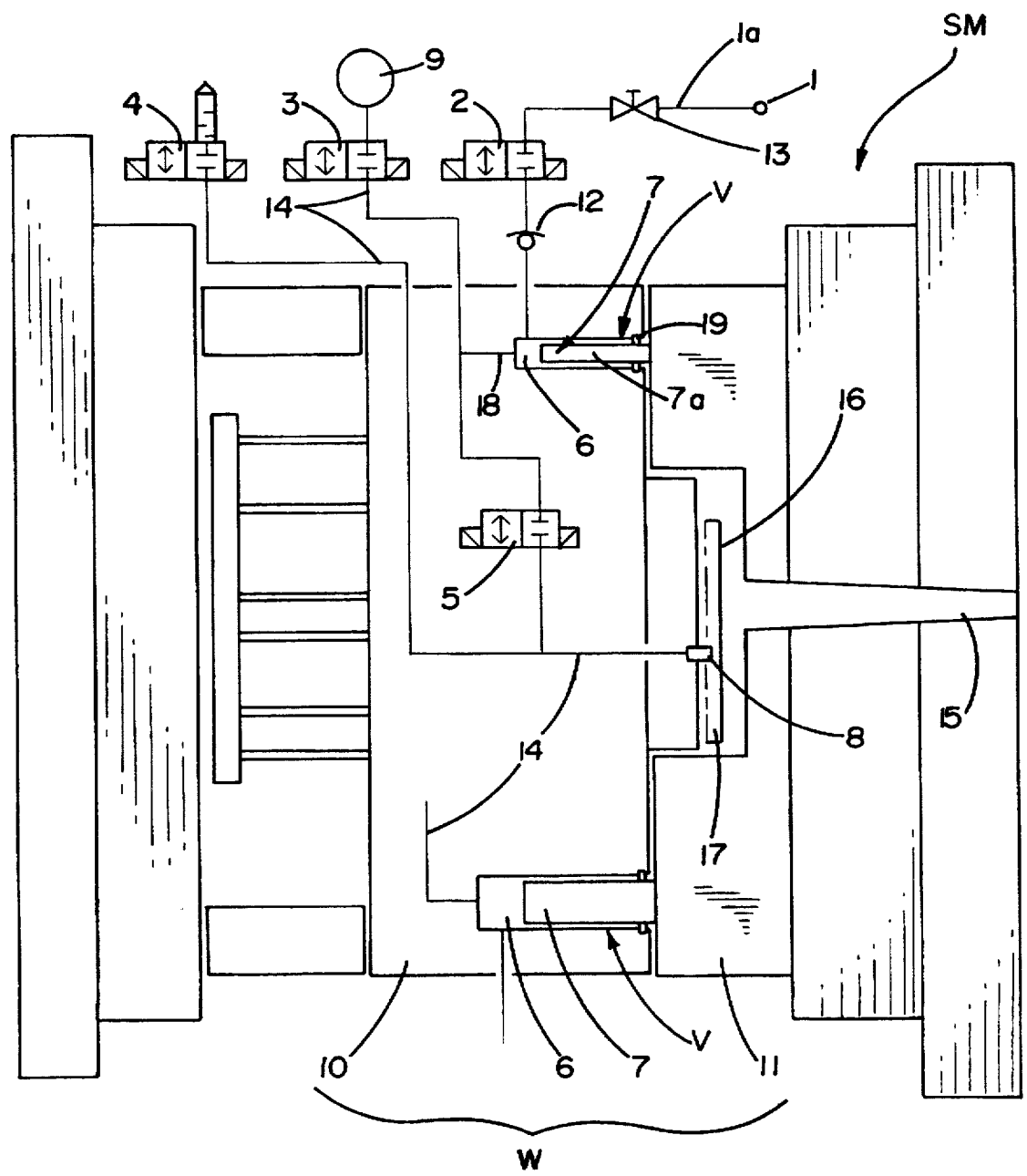
FIG. 1 schematically depicts a compression apparatus which comprises several working chambers which can be connected in series, the associated working elements acting, at the same time, as guide means.

In the figures of the drawing the same or similar parts are provided with the same reference numbers, and in the following description and claims the term "mold part" means not only the forming mold itself, but also in, general, its carrier as well as press platens, adapter plates, slides or the like.

FIG. 1 schematically shows an injection molding machine SM which has a forming mold W which is comprised of a movable mold part 10 and a stationary mold part 11. Here, the term "mold part" means not only the forming mold itself, but also generally its carrier platen, adapter plates, slides or the like.

In the closed state of forming mold W shown in FIG. 1, the two mold parts 10 and 11 define a mold cavity 17 for formation of a molded body 16. An injector or nozzle 8 allows pressurization of cavity 17, having an outlet which discharges into the cavity 17. On the feed line side of injector or nozzle 8, there is a valve 4.

In the example shown, a compression apparatus V that is integrated into the mold W of the injection molding machine SM. Compression apparatus V, for example, comprises at least one working chamber 6, two working chambers 6 being shown in FIG. 1. Working chambers 6 are sealed tight relative to the environment via a seal 19. In each working chamber 6, there is a working element 7 which, in the example shown, is formed by pin or rod 7a. Pins 7a act as pistons in working chambers 6. As shown, working elements 7 can have different diameters, i.e., they have effective surface areas of different sizes. The working element 7 shown at the bottom in FIG. 1 has a larger effective surface area than the working element 7 shown at the top of FIG. 1. Of course, working elements 7 can also have identical diameters and identical effective surface areas.

Via a gaseous medium connection 1 and an inlet line 1a in which an adjustable flow control valve 13, a solenoid on-off valve 2 and a one-way check valve 12 are provided, a gaseous medium with a selectable initial pressure can be introduced into each working chamber 6. The selectable pressure can also be the ambient pressure, for example. Check valve 12 suppresses flow of the gaseous medium back out of the respective working chamber 6. An outlet line 18 establishes a connection from each working chamber 6 to a storage device 9 via a second solenoid on-off valve 3, in the embodiment shown. Storage device 9 can be an intermediate storage device.

Furthermore, in FIG. 1, a runner channel 15 is shown via which an injection mass is supplied to the mold cavity 17 formed by the mold parts 10, 11 in their closed position to shape the molded body 16.

How the compression apparatus V operates will now be described. When mold W assumes its open position, which is not shown, movable mold part 10 is moved away from stationary mold part 11, for example, in the direction to the left in FIG. 1 relative to stationary mold part 11, so that the mold parts 10, 11 at a distance from one another. In this open position, the working elements 7 project only slightly into the respective working chamber 6. During the closing motion of mold W, i.e., as movable mold part 10 moves in the direction toward stationary mold part 11, the working elements 7 are caused to move into the working chambers 6, reducing the volume of working chambers 6 and compressing the gaseous medium located therein. If now mold W assumes the closed position shown in FIG. 1, the maximum compression pressure of compression apparatus V is achieved and the compressed medium is released from working chamber 6, via outlet line 18, and now open valve 3 to the storage device 9. If, at this point, cavity 17 is to be pressurized with gas via nozzle or injector 8, valve 5 is opened in order to cause the compressed medium to act in cavity 17, when shaped body 16 is injection molded with mold W closed. This pressurization can take place before, during, or after injection of the injection mass via runner channel 15. During action of the compressed medium in the cavity 17, valves 2 and 4 are closed and valves 3 and 5 are opened. Then, after the time of action is concluded, the valves 5 and 3 are closed and a valve 4 is opened to discharge unincorporated gas from the mold via line 14. Afterwards, movable mold part 10 is again moved away from stationary mold part 11, and mold W then resumes its open position. Finished shaped body 16 can be removed and one injection molding process is finished.

Using compression apparatus V, a constant pressure can also be maintained which acts in cavity 17 in the closed position of mold W. When mold W is slowly opened the pressure can drop by the gaseous medium enclosed in working chamber 6 being pushed back and in doing so expansion taking place. Shortly before mold W assumes its completely opened opening position, the pressure can be reduced to ambient pressure via an auxiliary valve which is not shown.

Of course, compression apparatus V can also be operated without storage device 9, so that in a controllable manner, depending on time, the compressed gaseous medium can then be supplied, for example, directly via the outlet line and interposed control valve 5 to injector or nozzle 8, which is being used as the consumer.

The pressure control and/or supply to a consumer, such as mold cavity 17, via injector or nozzle 8, which can be done in conjunction with compression apparatus V, are each selected depending on the desired requirements and circumstances of injection molding machine SM and the above explained control examples are not of a limiting nature at all. Rather, what is important is that compression apparatus V, which comprises working chamber 6 and working element 7, is arranged and can be operated using, for example, the closing motion of mold W is used for compression of the gaseous medium enclosed in working chamber 6 and is undertaken in interaction with mold forming parts 10, 11, including platens, adapter plates, or the like. The compressed gaseous medium obtained by means of compression apparatus V can then be used for a consumer which can be a means via which a mold cavity 17 is pressurized with elevated gas pressure. Accordingly, it is important for the compression apparatus V according to the invention that, in the application of injection molding machine SM, for example, no additional pressure generation system with supply means and the like is required, but that pressure generation and compression take place directly by interaction with relatively movable mold forming parts 10, 11.

Depending on the choice of the size of the effective surfaces of working elements 7 and the corresponding dimensions of working chamber 6, different compression stages and final compression pressures can be optionally achieved. The adaptation of dimensions is made dependent on the application and need, so that compression apparatus V can be generally designed specific to the application.

Figure 2:
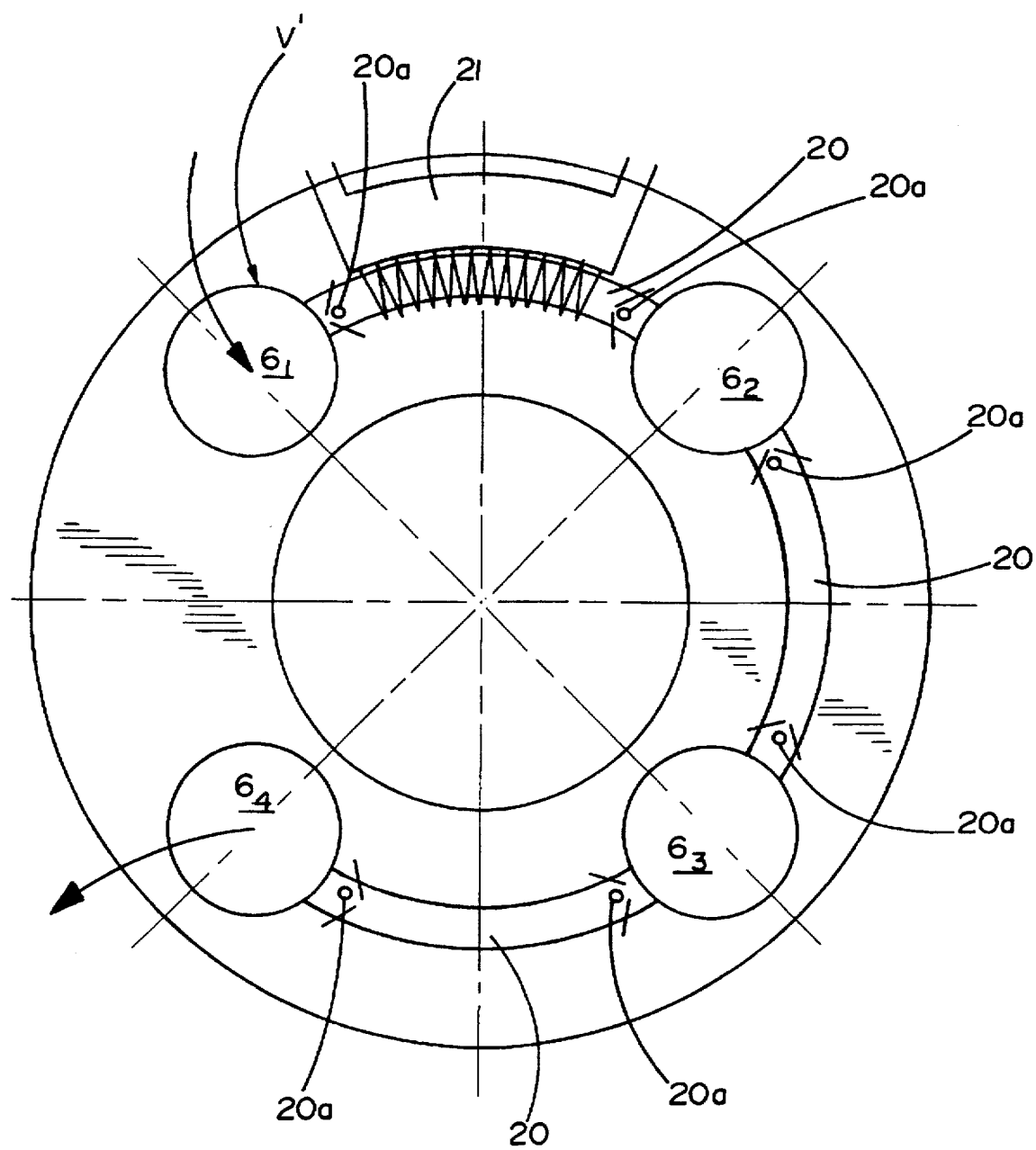
FIG. 2 is a cross-sectional schematic illustrating the series connection of the several working chambers of a compression apparatus similar to that shown in FIG. 1.

FIG. 2 schematically shows a compression apparatus V' which comprises four working chambers $6_1$ through $6_4$ in the example shown. The working chambers $6_1$ through $6_4$ and the respectively assigned working elements are not detailed for reasons of clarity. They can be constructed, for example, as illustrated in FIG. 1. The outputs of the working chambers $6_1$ through $6_4$ are each connected via connection lines 20, each of which contains a check valve 20a on the input side and on the output side for formation of a series connected arrangement of the chambers. With this series connection of the working chambers $6_1$ through $6_4$ compression can take place in compression apparatus V' in several stages, since the compressed gaseous medium is present as the initial medium in the respective following working chambers $6_2$, $6_3$, and $6_4$ via respective connecting line 20. The flow direction of compression apparatus V' with the series connected arrangement is illustrated with arrows. The medium compressed in respective working chamber $6_1$ through $6_4$ can be cooled in route via connecting line 20 to the respectively downstream working chamber, for which a cooling means 21 is shown schematically in FIG. 2. Water can be used as the cooling medium in cooling means 21. In this way, the temperature of the compressed gaseous medium can be lowered before it is further compressed in the next working chamber. Although in FIG. 1 cooling means 21 is shown between working chambers $6_1$ and $6_2$, of course, additional cooling means can, optionally, be provided between working chambers $6_2$ and $6_3$ or $6_3$ and $6_4$.

Cooling by cooling means 21 is dependent on the compression stage and especially on the respectively attainable compression pressure of the gaseous medium.

Using FIGS. 3 through 5, another preferred embodiment of schematically shown injection molding machine SM will now be described. Details of the mold W and the mold forming parts are omitted there for reasons of clarity. In accordance with the above described embodiment, the modified injection molding machine SM of FIGS. 3–5 comprises a movable mold part 10 and a stationary mold part 11 which are guided to move relative to one another on guide columns 25 which are attached to a base frame under the action of a piston 26 which moves mold part 10 in the direction to stationary mold part 11 during a closing motion and away from stationary forming mold part 11 for opening of the mold W. Mold W is shown in FIG. 3 in its open position.

In this embodiment, the compression apparatus labelled V" is mounted to the movable mold part 10. For the sake of illustration, compression apparatus V" has been broken away to show one working chamber 6 and the associated working element 7 therein. As more clearly shown in FIG. 4, the working chamber 6 is sealed tight at its open front end by a seal 19, and working element 7 is inserted such that, in the base position shown in FIG. 3, it projects slightly into working chamber 6. Inlet line 1a and outlet line 18 (which are shown schematically in the figures) are connected to working chamber 6. Proceeding from the open position of mold W shown in FIG. 3, movable mold part 10 is moved in the direction to stationary forming mold part 11 into the closed position shown in FIG. 5 by the actuation of closing piston 26. During this closing motion, working elements 7 abut facing surface 27 of the stationary mold part 11, causing the working elements 7 to be moved into the respective working chamber 6. In this way, the gaseous medium containing volume of working chamber 6 is reduced and the gaseous medium located therein is compressed during the closing motion. The gaseous medium compressed in this way, in each working chamber 6, is then sent directly or indirectly to a consumer, as explained above, via outlet line 18. Details regarding the valve arrangements and the like are not illustrated in this second preferred embodiment and the above explained controls can also be feasibly provided.

Figure 3:
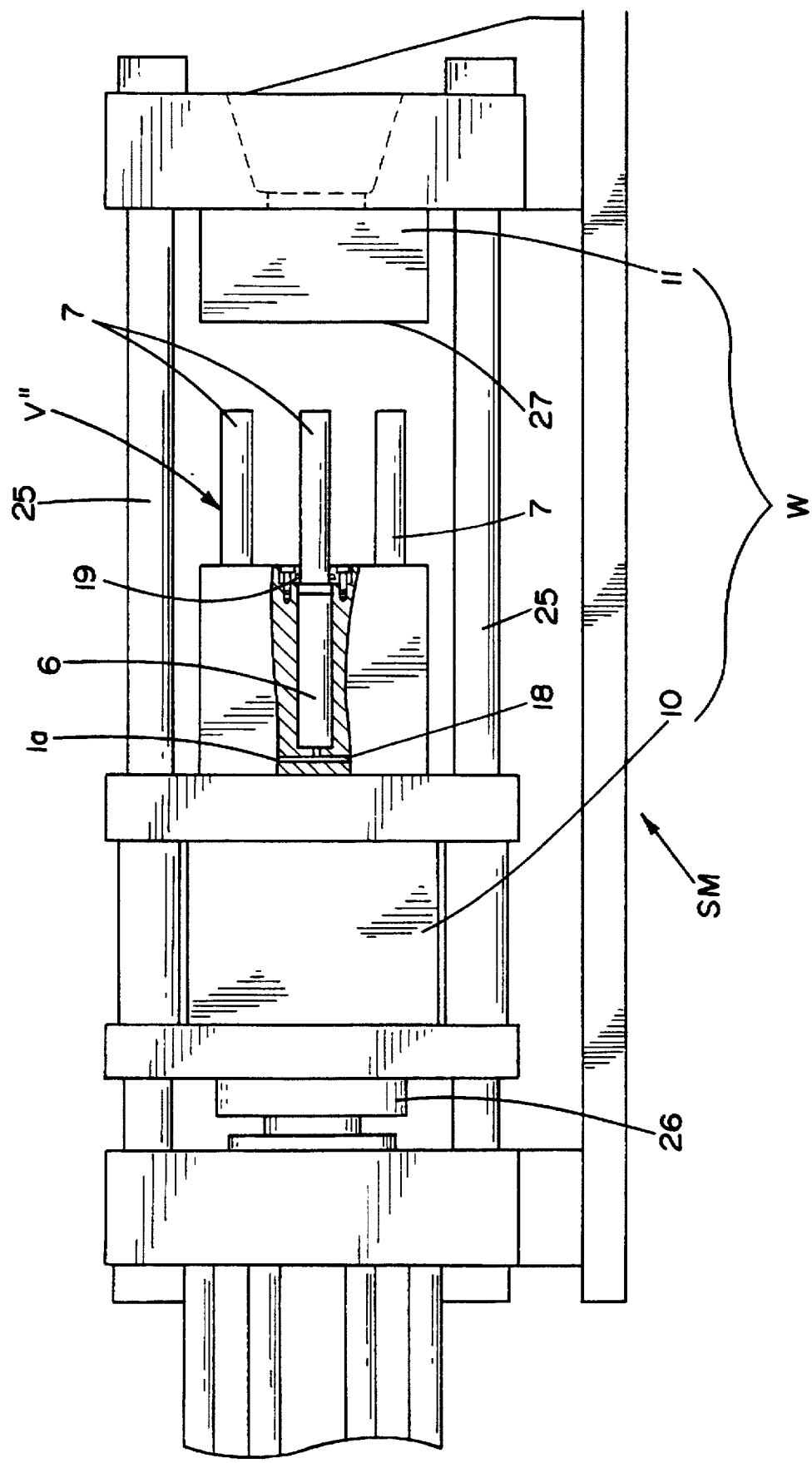
FIG. 3 is a schematic view of an injection molding machine with one movable and one stationary mold part, the compression apparatus being associated as a whole with the movable mold part and prior to initiation of the compression process.
Figure 5:
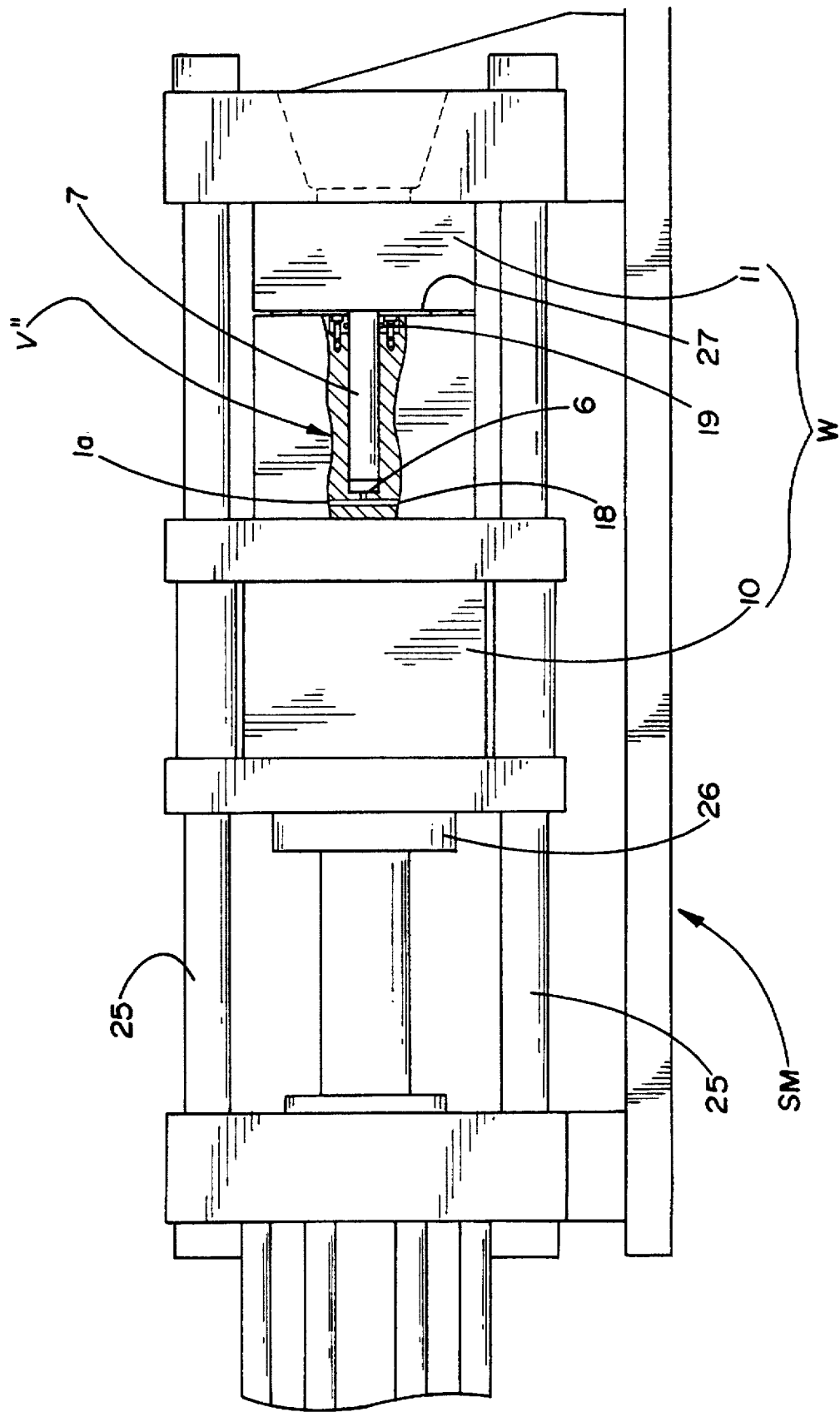

If, during the opening motion of mold W, the movable mold part 10 is moved proceeding in the direction of the open position according to FIG. 3 from the closed position of FIG. 5, the working elements 7 come free from surface 27 of stationary forming mold part 11 and working elements 7 can again move back into their initial FIG. 3 position (under the action of supplied gaseous medium), so that the compression process can be repeated in the next closing process in the same manner as has been explained above.

Figure 4:
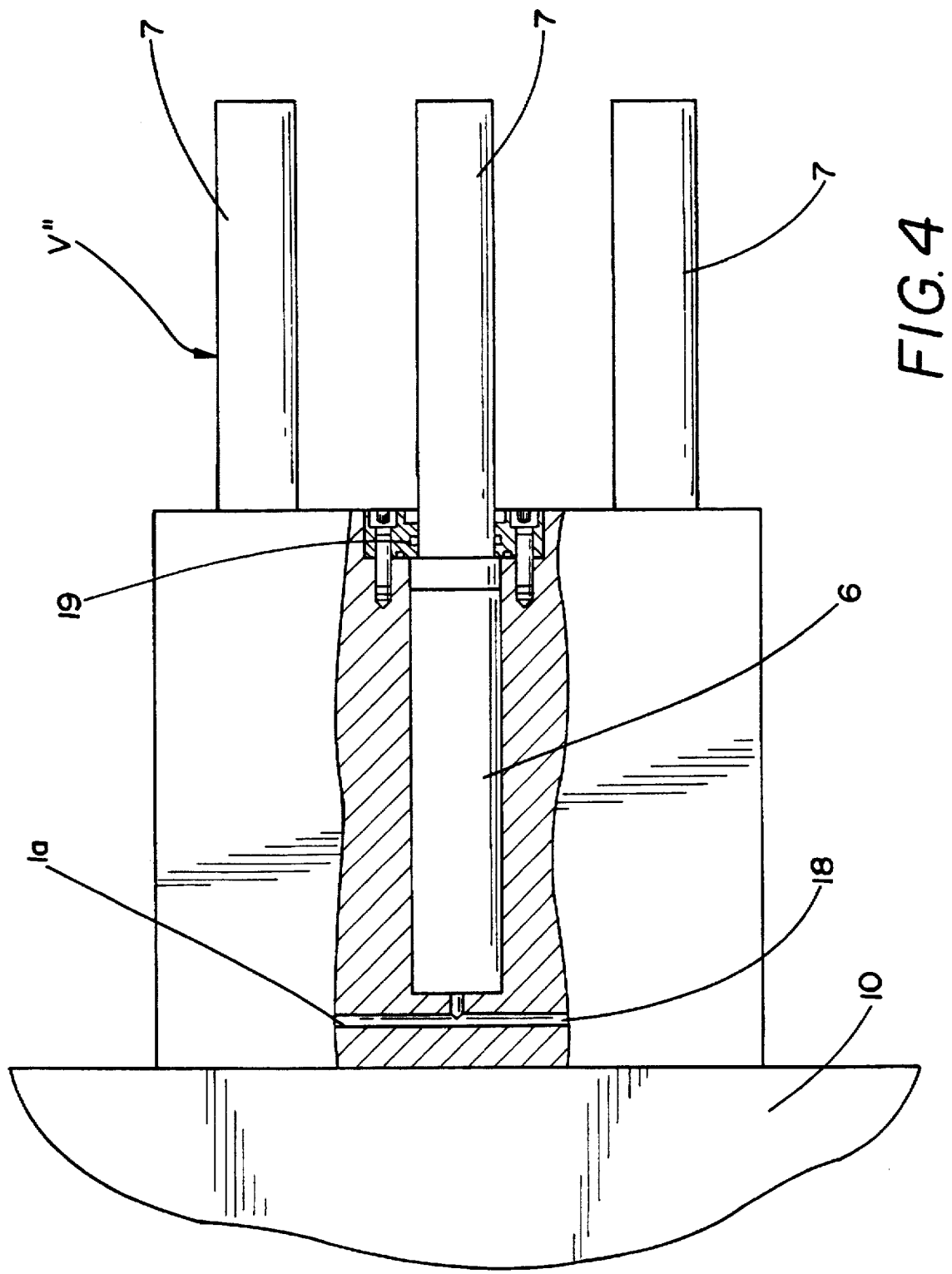
FIG. 4 shows an enlarged view of the structural details of an arrangement comprising a working chamber and working element of the compression apparatus of FIG. 3.
Figure 6:
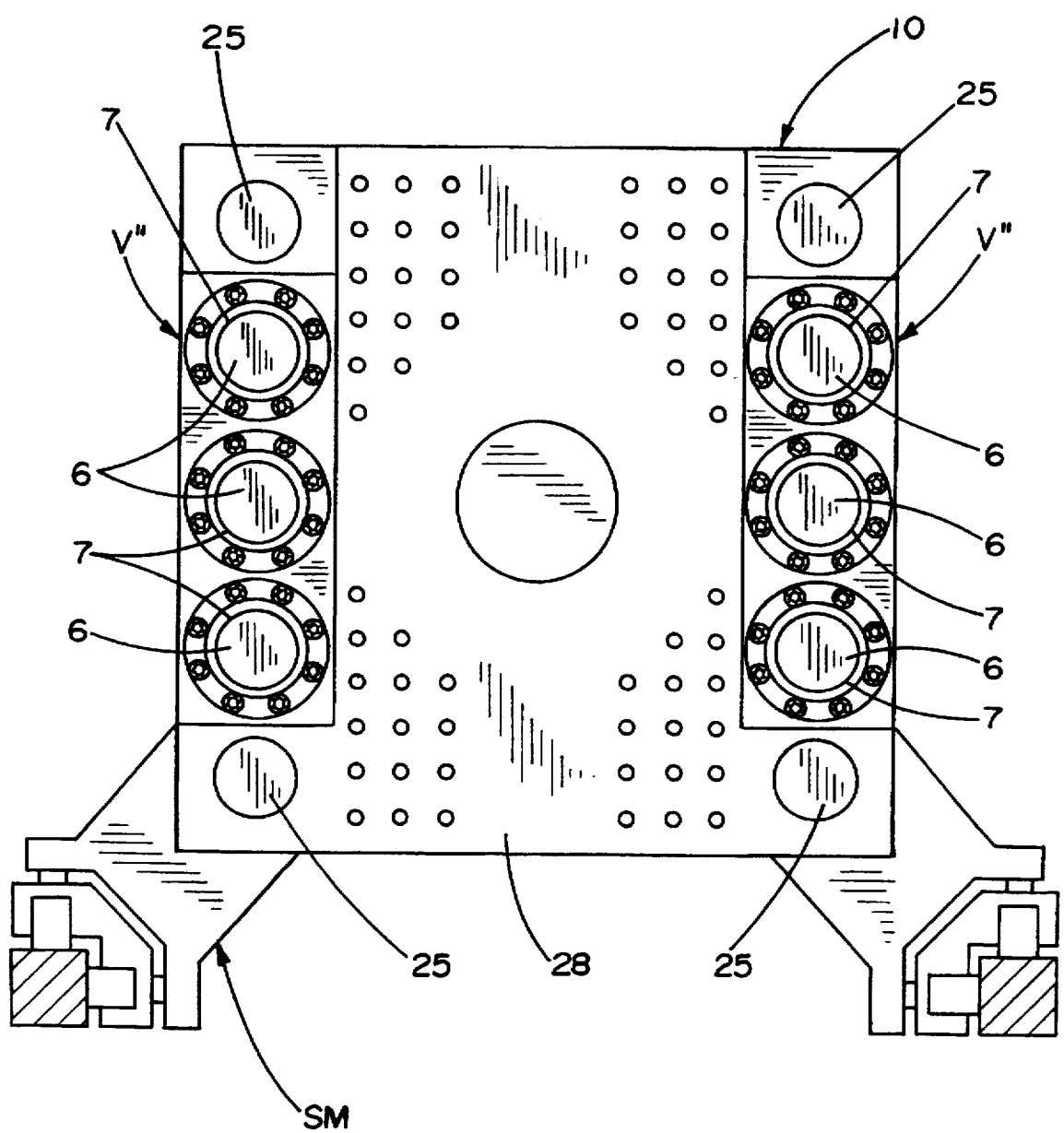
FIG. 6 is a schematic view of a movable mold forming part with a compression apparatus which comprises several working chambers and several working elements, which is mounted to the moveable forming mold part.

Based on the design of injection molding machine SM, shown by way of example using FIGS. 3 through 5, in FIG. 6 an end view of the movable mold part 10 is shown. In this example, according to FIG. 6, the compression apparatus V" is mounted on movable mold part 10, for example, in the opposite configuration. Compression apparatus V" with working chambers 6 and working elements 7 is attached to adapter plate 28 of movable mold part 10. Compression apparatus V" according to FIG. 6 comprises 3 units at each side, each unit being formed by a working chamber 6 and an associated working element 7. Of course, the number of units is selectable in correspondence with the needs of the respective application and the required compression pressures.

Figure 7:
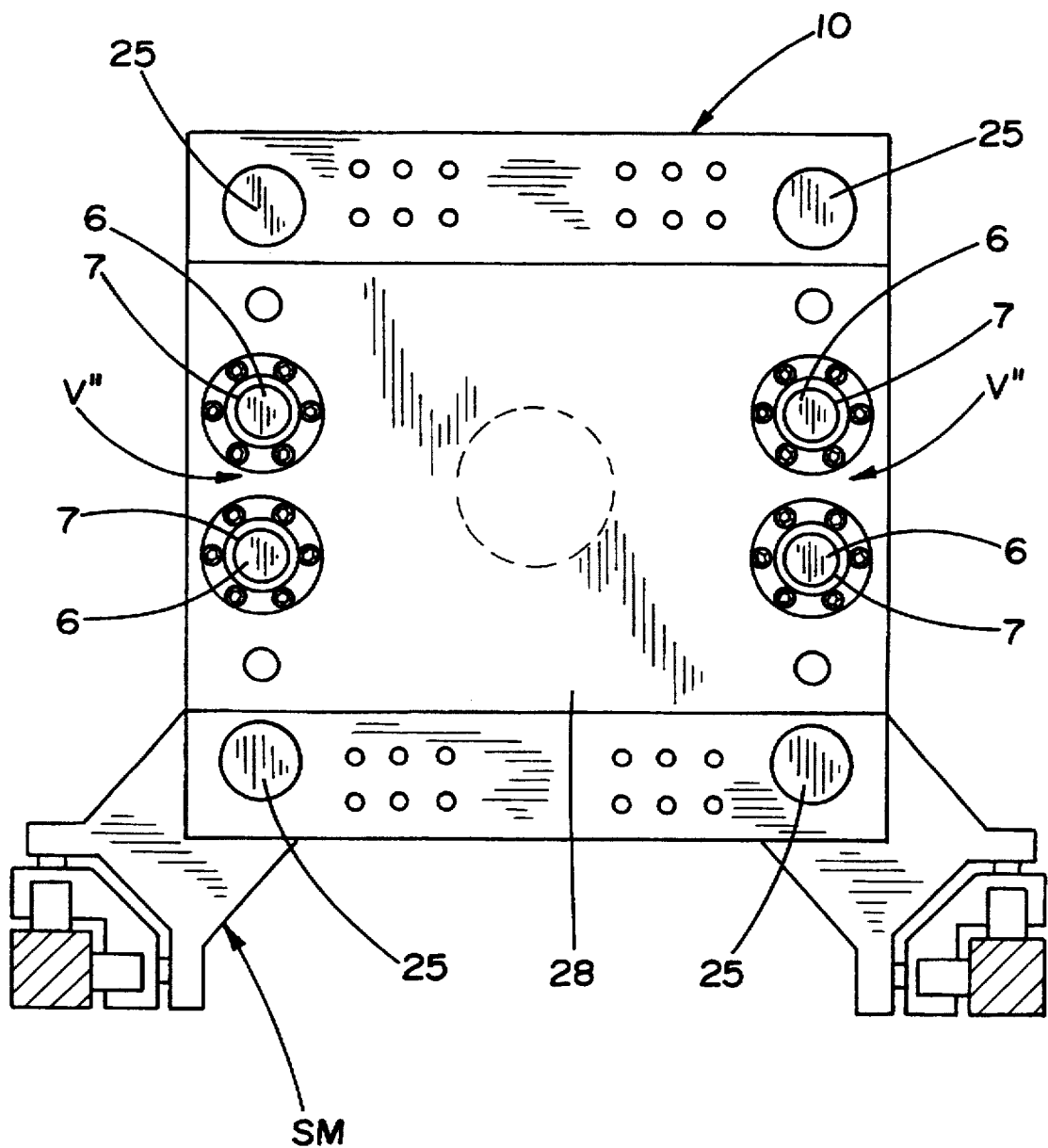
FIG. 7 shows a view a movable forming mold part into which the compression apparatus in integrated.

FIG. 7 shows another embodiment of compression apparatus V". In contrast to the embodiment according to FIG. 6, the units of compression apparatus V" according to FIG. 7 are integrated into the movable mold part 10. In the embodiment according to FIG. 7, there are two units of compression apparatus V" on each side of the movable mold part 10, but this embodiment of the invention is not limited to the use of this number of units.

Although, compression apparatus V" of the embodiments according to FIGS. 3 through 7, comprise compression units in which the working chambers 6 and working elements 7 are physically associated with movable mold part 10, this need not necessarily be the case. Thus, for example, in contrast to the embodiment shown, compression apparatus V" can be optionally associated with the stationary mold part 11, being integrated into it or mounted on it. Similar to what is shown in FIG. 1, working element 7 can be associated with, for example, with the stationary mold part 11 and the working chamber 6 with the movable mold part 10 or vice versa.

All these embodiments and combinations thereof in integrated or mounted versions are possible and are encompassed by the scope of the invention.

It is common to all the above described embodiments and versions that, for example, in conjunction with the closing motion of mold W, compression takes place in working chamber 6 of compression apparatus V, V', and V" in order to make available a compressed gaseous medium which can be supplied to a consumer, for example, the mold cavity 17, via an injector or nozzle 8. The controls of compression apparatus V, V', and V" can then be implemented in the corresponding manner with or without interposition of storage device 9 depending on requirements.

Thus, while various embodiments in accordance with the present invention have been shown and described, it should be understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Apparatus for compressing a gaseous medium comprising a pair of mold parts mounted for relative movement with respect to each other to open and close said mold parts, drive means for producing said relative movement and at least one gas compressing unit having a working element which is movable in a working chamber, said gas compressing unit being physically associated with at least one of said mold parts in a manner producing relative movement of the working element and working chamber in direct relation to the relative movement of the mold parts in a mold closing direction to define means for compressing a gaseous medium in the working chamber with the working element during closure of said mold parts, wherein said working chamber is connected to an inlet by which the gaseous medium is delivered to the working chamber and to a supply means for receiving the gaseous medium after it has been compressed in said working chamber, and wherein the supply means comprises an outlet line connected to a gaseous medium consumer.

2. Apparatus according to claim 1, wherein said outlet line of the supply means is connected to a mold cavity formed by the mold parts for pressurization of said mold cavity which constitutes said gaseous medium consumer.

3. Apparatus according to claim 1, wherein the outlet line is connected to a gaseous medium storage device in addition to being connected to said gaseous medium consumer.

4. Apparatus according to claim 3, wherein the storage device is selectively connectable to the gaseous medium consumer.

5. Apparatus according to claim 1, wherein a plurality of said compressing units are provided; and wherein the working chambers of the working units are connected in series via connecting channels.

6. Apparatus according to claim 5, wherein the working elements of said compressing units have different effective surface areas.

7. Apparatus according to claim 5, wherein intermediate cooling means for cooling of gaseous medium passing through at least one of the connecting channels is provided.

8. Apparatus according to claim 7, wherein the intermediate cooling means comprises a liquid coolant circulating arrangement.

9. Apparatus according to claim 1, wherein the working chamber is connected to a source of the gaseous medium via an inlet line connected to said inlet and having a flow control valve and a one-way check valve therein, defining a means for providing the working chamber with a predetermined pressure of the gaseous medium before movement of the mold parts in said closing direction.

10. Apparatus according to claim 9, wherein a valve is provided defining a means for producing a drop in said predetermined pressure during opening of the mold parts in a manner bringing the working chamber to ambient pressure shortly before complete opening of the mold.

11. Apparatus according to claim 1, wherein the working chamber and the working element are integrated into one of said mold parts.

12. Apparatus according to claim 1, wherein the working chamber and the working element are each mounted to a respective one of the mold parts and interact during said relative movement of the mold parts.

13. Apparatus according to claim 12, wherein the mold parts comprise a movable mold part and a stationary mold part; and wherein the working chamber is on the movable mold part and the working element is on the stationary mold part.

14. Apparatus according to claim 1, wherein the mold parts comprise a movable mold part and a stationary mold part; and wherein the working chamber and the working element are mounted to the movable mold part.

15. Apparatus according to claim 1, wherein the working element is formed by a rod on one of the mold parts and the working chamber is formed by a location hole in a facing surface of the other mold part, within which the rod is accommodated.

16. Apparatus according to claim 15, wherein the rod and the location hole form mold guide parts for guiding of the mold parts during their relative movement for opening and closing of the mold.

17. Apparatus according to claim 16, wherein the mold parts define an injection mold.

18. Apparatus according to claim 2, wherein said outlet line is connected to a nozzle which discharges into the mold cavity formed by the mold parts.

* * * * *